2,557,989

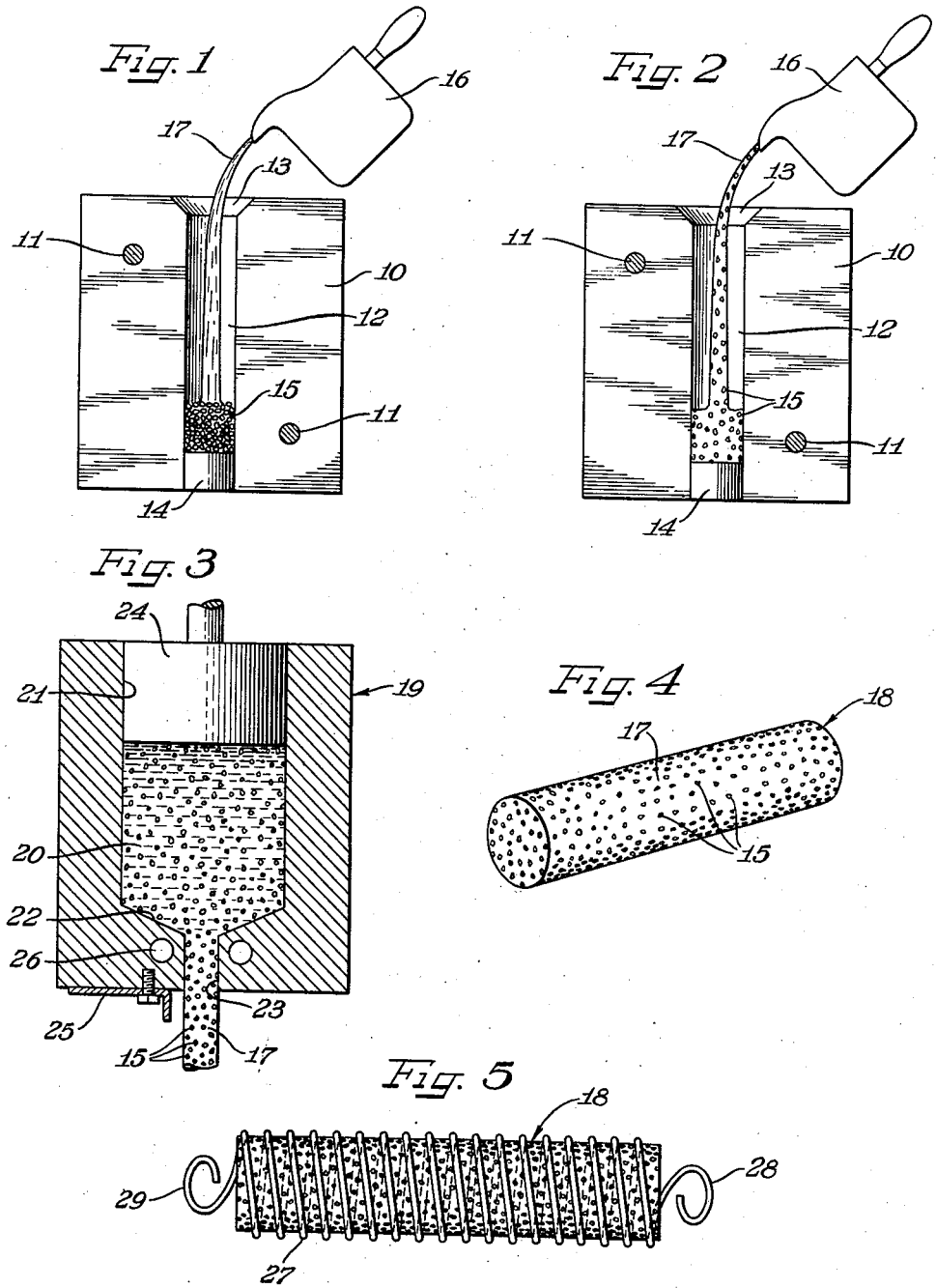
June 26, 1951     K. L. McINTOSH     2,557,989
ELECTROLYTIC WATER CORRECTION DEVICE
Filed May 28, 1948
Inventor
Kenneth Lea McIntosh Patented June 26, 1951

UNITED STATES PATENT OFFICE 2,557,989

ELECTROLYTIC WATER CORRECTION DEVICE

Kenneth Lea McIntosh, New Orleans, La., assignor, by mesne assignments, to Butler De-Scaler Corporation, Jacksonville, Fla., a corporation of Florida Application May 28, 1948, Serial No. 29,902

6 Claims. (Cl. 204—248)

The present invention relates to an electrolytic water correction device and more particularly to a self-energizing electrolytic water correction device capable of water correction action at relatively low temperatures and in waters containing relatively low concentrations of dissolved salts.

This application is a continuation-in-part of my copending application Serial No. 658,412, filed in the U. S. Patent Office on March 30, 1946, now abandoned.

The electrolytic water correction devices of the prior art, as exemplified by the issued Edgar M. Butler Patents Nos. 2,321,796 and 2,424,145, consist of a solid anode of zinc, or other negative metal above hydrogen in the electromotive force series of metals, and a cathode of copper, silver or other positive metal below hydrogen in the electromotive force series. The cathode is generally formed as a housing or sheath for the solid anode, the assembly being tightly clamped or fitted together to insure good electrical surface contact between the positive and negative elements and to prevent relative separation of the elements during use.

In accordance with well-known electrochemical principles, a device such as that described acts as a galvanic couple when immersed in an aqueous electrolyte, the negative element being electrolytically dispersed into the water to produce metallic ions which immediately combine with the water to give hydrated metallic ions. These metallic ions react with hydroxyl ions to yield insoluble metal hydroxides. The metallic ions or the insoluble metallic hydroxides so formed react with or in some way entrain the calcium and magnesium ions present in the water, with the result that a soft sludge is formed rather than the usual hard, adherent scale such as builds up on heat transfer surfaces or boilers or other water circulatory systems.

In addition to preventing scale formation, the use of a self-energizing electrolytic water correction device tends to break up any scale already formed. As a result of the removal of calcium and magnesium ions from the water, the water in contact with any scale already formed is almost free of these ions, and hence has a capacity for dissolving the salt that composes the scale.

My present invention provides a novel, more sensitive type of self-energizing electrolytic water correction device which is capable of functioning efficiently in systems in which the circulating fluid is maintained at relatively low temperatures as well as in systems in which the electrolyte contains a very small amount of dissolved ionizable matter or in which the concentration of dissolved matter in the electrolyte is so high as to prevent efficient operation of conventional devices due to the precipitation of solids on the surfaces of the positive and negative elements of these devices.

In general, the present invention comprises an electrolytic water correction device having a negative element composed of a metal selected from the group consisting of zinc, aluminum or magnesium, and having dispersed therein discrete particles of nickel, copper or silver, each of which is lower in the electromotive force series of metals than zinc. A negative element core containing the dispersed particles as above described is encased in a positive element sheath composed of a metal lower in the electromotive force series of metals, which metal may suitably be either copper or a copper- or silver-plated foundation metal. In the preferred form of the present invention, the positive metal sheath is in the form of a helical spring which is tightly wound about the negative element core to resiliently retain the same in position by frictionally gripping the surface thereof.

When the device of the present invention is immersed in the electrolyte, a myriad of local galvanic cells are set up between the negative element and the positive element sheath and also between the negative element and the relatively positive particles dispersed therein. Due to these local galvanic cells, the negative element is attacked and caused by electrolytic action to go into solution or dispersion in the water to electrolytically correct the same. Even though the surface of the positive element sheath may be completely covered by matter precipitated from aqueous solution in the water, galvanic action will still be obtained between the negative element core and the particles dispersed therein. Further, the great number of galvanic cells obtained upon immersion of the device in the electrolyte makes possible its efficient operation at relatively low temperatures or low electrolyte concentrations. Thus, it may be seen that the electrolytic water correction device of the present invention is operable under milder temperature conditions than devices heretofore known.

It is, therefore an important object of the present invention to provide a self-energizing electrolytic water correction device for operation at relatively low temperatures and in electrolytes containing either a relatively low or high concentration of dissolved salts.

It is a further important object of the present invention to provide a self-energizing electrolytic water correction device comprising a negative element core having dispersed therein discrete particles of an electropositive metal and a positive metal sheath in tight surface engagement with said negative element core.

It is a still further important object of the present invention to provide a self-energizing electrolytic water correction device comprising a negative element core containing discrete particles of nickel dispersed therein, and a positive metal sheath in tight surface engagement with the negative element core, whereby in use said negative element is caused to be dispersed into the water to be treated by the combined galvanic action between the core and the sheath and between the core and the nickel particles dispersed therein.

Other and further important objects of this invention will be apparent from the disclosures in the specification and the accompanying drawings.

On the drawings:

Figure 1 is an elevational view of a two-part mold, with a portion of the mold removed, illustrating the pouring of a charge of molten zinc into the mold containing a plurality of nickel particles;

Figure 2 is an elevational view similar to Figure 1 illustrating the pouring of a charge of molten zinc to which pellets of nickel have been added just prior to the pouring;

Figure 3 is a longitudinal cross-sectional view, with parts shown in elevation, illustrating a method of forming a negative element cartridge by the extrusion of molten zinc containing nickel pellets dispersed therein;

Figure 4 is a perspective view of a zinc anode containing dispersed nickel particles as prepared by the methods illustrated in Figures 1–3; and Figure 5 is a side elevational view of a self-energizing electrolytic water correction device of the present invention.

As shown on the drawings:

The negative element core of the electrolytic water correction device of the present invention containing discrete particles of a relatively more positive element may be prepared by several methods, three of which are illustrated in the Figures 1–3, inclusive, of the drawings. For example, in Figure 1 a method of preparing a cartridge of zinc and nickel by casting is illustrated. The reference numeral 10 refers generally to one-half of a two-part mold, the other half of the mold being eliminated for purposes of illustration. The mold parts may be suitably held in alignment by means of dowel pins 11 and may be clamped together by any suitable means (not shown). Each of the mold parts 10 is provided with a complementary semi-cylindrical cavity 12 which is flared at the top to form a semi-conical pouring opening 13. The bottom of the cylindrical mold cavity formed by the assembly of the two mold halves 10 is closed by means of the cylindrical plug 14. In the method of casting illustrated in Figure 1, a charge of nickel copper or silver pellets 15 is placed in the bottom of the cylindrical cavity 12 and molten zinc is poured into the cavity 12 from a ladle 16. The stream of molten zinc 17 dropping into the cylindrical cavity 12 impinges directly on the nickel copper or silver pellets 15, the motion imparted to the pellets by the stream of zinc serving to distribute the pellets uniformly throughout the molten zinc contained in the cavity 12. Due to the relatively thick chill walls of the mold 10 the zinc is rapidly solidified within the mold cavity 12 without allowing a sufficient time to permit any substantial alloying of the zinc and nickel or any substantial segregation of the nickel pellets due to the difference in specific gravity between the zinc and the nickel. The casting, in the form of a cartridge 18 of Fig. 4, is formed upon solidification of the zinc within the mold cavity 12. The completed cartridge 18 may be removed by pushing the plug 14 through the cylindrical cavity 12 by any suitable means (not shown).

In the method as illustrated in Fig. 2, an identical type of mold 10 is employed having a cylindrical cavity 12, a semi-conical pouring opening 13 and a closure plug 14. In this method of preparing the cartridge 18, the zinc is initially melted in the ladle 16 and nickel pellets 15 similar to the pellets 15 of Fig. 1 are added to the molten zinc in the ladle prior to the pouring operation. In this manner a substantially uniform dispersion of nickel particles in the molten zinc contained in the cavity 12 is obtained and an even dispersion of the nickel particles throughout the cartridge 18 is obtained upon solidification of the molten zinc. Following solidification the cartridge may be removed in a manner similar to that described in connection with Fig. 1.

As illustrated in Fig. 3, the cartridge 18 may be formed by the extrusion of a molten mass of zinc containing nickel pellets dispersed therein. In Fig. 3, reference numeral 19 refers generally to an extrusion mold having a central cavity 20 defined by substantially cylindrical inner wall surfaces 21. The lower portions of the inner wall surfaces slope downwardly and inwardly as at 22 to allow communication between a central extrusion aperture 23 and the central cavity 20. A plunger 24 is adapted to fit snugly within the cylindrical cavity 20 and to be moved therein by any suitable means (not shown). A pivoted closure plate or gate 25 is adapted for closing the cylindrical opening 23 so that the mold cavity 20 may be filled with molten metal 17, such as zinc, containing dispersed discrete particles 15 of nickel. In general, the electropositive metal pellets should have a maximum dimension of not over ⅛ inch. Following the introduction of the molten zinc containing dispersed nickel particles into the mold cavity 20, the molten metal is subjected to pressure by means of the plunger 24. The zinc, containing the dispersed nickel pellets, is extruded through the aperture 23 following the opening of gate 25. If desired, the molten zinc may be chilled while being extruded through the cavity 22 by any suitable means, as by circulation of a fluid coolant through the circular passage 26 in the mold 19 surrounding the aperture 23.

The cartridge 18, as illustrated in Fig. 4, comprises a body of zinc 17, which constitutes a continuous solid phase, and particles 15 of nickel distributed as a disperse solid phase substantially uniformly throughout the mass of zinc 17. Some of the nickel particles 15 will be exposed at various points over the surface of the cartridge 18. As illustrated in Figure 5, the complete self-energizing electrolytic water correction device of the present invention comprises the cartridge 18 of zinc having the nickel particles dispersed therethrough and a positive metal sheath of copper or copper- or silver-plated foundation metal. The positive metal sheath 27 may preferably be in the form of a helical coil of wire which is normally of an interior diameter slightly less than the exterior diameter of the cartridge 18. The coiled wire when slipped in place over the cartridge 18 resiliently engages the cartridge to resist relative separation of the two. The wire coil 27 is provided with free ends 28 and 29 which are bent inwardly to form hooks or loops overlying the ends of the cartridge for suspending or maintaining the water correction device in position in the water to be corrected.

The cartridge 18 may be cylindrical in form, as illustrated, or may be polygonal in cross section and is preferably formed of zinc, or other metal, such as aluminum or magnesium, that is relatively high with respect to hydrogen in the electromotive force series of metals. The combination of zinc and dispersed nickel particles in the cartridge 18 is preferred since the difference in their melting points reduces the amount of alloying that takes place during the casting or extrusion operation and thus ensures the presence of the pellets as discrete solid particles. The amount of electropositive metal, such as nickel, present in the cartridge may vary from about 1 or 2% to as much as 20% by weight of the cartridge. I have found that satisfactory results may be obtained in this range of ingredients, although I prefer to employ from 2 to 5% nickel for economical operation.

The coiled wire sheath 27 may be formed of hard copper, bronze or ferrous foundation metal having the requisite amount of resiliency and the surface of the wire may be either copper or silver plated. It will be noted that the coils of the wire sheath 27 are spaced not only to permit easy access of the water to the surface of the negative element of the cartridge 18 but also to enable electropositive particles 15, which become separated from the zinc body upon dissolution of the zinc, to fall freely from the cartridge during use. These particles 15 are of such size that no substantial damage to the water circulatory system in which the device is employed is occasioned by this displacement of the pellets. Although the coils of the wire sheath are rather tightly wound about the core or cartridge 18, the water, by capillary action, will penetrate between the coils and the surface of the cartridge 18.

The water, due to its content of dissolved ionizable substances, acts as an electrolyte to set up a galvanic action between the dissimilar elements of the cartridge 18 and of the wire sheath 27 or of the coating metal of the wire sheath. Further, the water serves as an electrolyte to cause galvanic action between the zinc mass of the cartridge 18 and the discrete nickel pellets 15 disposed therein. Thus a myriad of galvanic couples is created not only between the cartridge 18 and the sheath 27 but also between the zinc mass 17 of the cartridge and the discrete particles 15 dispersed therein. This creation of a myriad of galvanic cells makes the device herein provided more susceptible to electrolytic action immediately following immersion in the electrolyte and makes possible the initiation of galvanic action even though the electrolyte may be at such a low temperature or may contain such a small proportion of dissolved substances as to render prior art devices inoperable. Not only are a myriad of galvanic cells set up all over the surface of the cartridge 18, but these cells are replaced by other cells as corrosion of the cartridge proceeds with the exposure of additional nickel particles embedded in the interior of the zinc mass 17.

Thus it may be seen that the present invention provides an electrolytic water correction device which employs a negative element or cartridge which is composed predominately of electronegative metal, such as zinc, with particles of electropositive metal, such as nickel, distributed substantially uniformly throughout the mass of electronegative metal and exposed at numerous points over the surface thereof. Such an element is not rendered inactive by the formation of an insulating film over its surface, such so long as the aqueous electrolyte, such as "hard" water, can diffuse or penetrate to the actual surface of the element, the electrolytic action takes place wherever there is a sufficient electropotential difference at the surface in contact with the electrolytes. Further, any scale or encrustation formed on the surface of the cartridge 18 will be continuously sloughed off by the expansion of the cartridge as electrolytic dissolution of the zinc progresses. The active surface will thus be left comparatively clean to insure substantially continuous activity of the device even though galvanic action between the cartridge and the positive metal sheath may be interrupted. The helical spring-type sheath is preferred for use in the present invention since, by its resilient engagement of the surface of the cartridge, displacement of zinc during expansion of the cartridge is prevented and also since the additional galvanic action obtained between the sheath and the cartridge accomplishes a more efficient correction of the aqueous electrolyte.

It will, of course, be understood that various details of construction may be varied through a wide range without departing from the principles of this invention and it is, therefore, not the purpose to limit the patent granted hereon otherwise than necessitated by the scope of the appended claims.

I claim as my invention.

1. A self-energizing electrolytic water correction device, comprising a member composed predominantly of a metal that is electronegative to hydrogen in the electromotive force series and having discrete particles of an electropositive metal of the electromotive force series in the form of pellets substantially uniformly distributed throughout the mass of said member, with some of said pellets partially embedded in and exposed at the surface thereof, said pellets being minute in all of their dimensions relative to the electronegative member as a whole and being so numerous and so well dispersed throughout said member that a myriad of local galvanic cells are set up all over the surface of said member when said member is submerged in an electrically conductive water and said cells are replaced by other cells as corrosion of said electronegative metal proceeds and some of said pellets become dislodged from said mass and other electropositive particles become exposed.

2. A self-energizing electrolytic water correction device, comprising a member composed predominantly of a metal that is electronegative to hydrogen in the electromotive force series and having discrete particles of an electropositive metal of the electromotive force series, said metal being selected from the group consisting of nickel, copper and silver, present in the form of pellets substantially uniformly distributed throughout the mass of said member, with some of said pellets partially embedded in and exposed at the surface thereof, said pellets being minute in all of their dimensions relative to the electronegative member as a whole and being so well dispersed throughout said member that a myriad of local galvanic cells are set up all over the surface of said member when said member is submerged in an electrically conductive water and said cells are replaced by other cells as corrosion of said electronegative metal proceeds and some of said pellets become dislodged from said mass and other electropositive particles become exposed.

3. A self-energizing electrolytic water correction device comprising a member composed predominantly of a metal that is electronegative to hydrogen in the electromotive force series of metals and having discrete particles of an electropositive metal of the electromotive force series of metals in the form of pellets substantially uniformly distributed throughout the mass of said member, with some of said pellets partially embedded in and exposed at the surface thereof, and a positive metal sheath frictionally engaging the surface of said cartridge while leaving substantial portions of the surface area of said cartridge exposed, said pellets being minute in all of their dimensions relative to the electronegative member as a whole and being so well dispersed throughout said member that a myriad of local galvanic cells are set up all over the surface of said member when said member is submerged in electrically conductive water and said cells are replaced by other cells as corrosion of said electronegative metal proceeds and some of said pellets becoming dislodged from said mass and other electropositive particles become exposed, and further galvanic cells are simultaneously set up between said member and said electropositive metal sheath.

4. A self-energizing electrolytic water correction device comprising a member composed predominantly of zinc and having discrete particles of copper substantially uniformly distributed throughout the mass of said member and exposed at the surface thereof, said particles being minute in all dimensions relative to said member as a whole and be so numerous and so well dispersed throughout said member that a multitude of local galvanic cells are set up all over the surface of said member when said member is submerged in an electrically conductive water and said cells are replaced by other cells as corrosion of said zinc proceeds and other copper particles become exposed.

5. A self-energizing electrolytic water correction device comprising a member composed predominantly of zinc and having discrete particles of silver substantially uniformly distributed throughout the mass of said member and exposed at the surface thereof, said particles being minute in all dimensions relative to said member as a whole and being so numerous and so well dispersed throughout said member that a multitude of local galvanic cells is set up all over the surface of said member when said member is submerged in an electrically conductive water and said cells are replaced by other cells as corrosion of said zinc proceeds and other silver particles become exposed.

6. A self-energizing electrolytic water correction device comprising a uniform cylindrical member of heterogeneous metallic structure, the composition of which consists essentially of from 82 to 90% of a metal that is electronegative to hydrogen in the electromotive force series of metals and from 1 to 20% of an electropositive metal of the electromotive force series, the electropositive metal being substantially uniformly distributed throughout the mass of said electronegative metal in the form of pellets, some of said pellets being partially embedded in the curved cylindrical surface of said member and exposed at a multitude of separated points over the surface of said member, said pellets being minute in all of their dimensions relative to the electronegative member as a whole and being so numerous and so well dispersed throughout said member that a myriad of local galvanic cells is set up all over the surface of said member when said member is submerged in an electrically conductive water and said cells are replaced by other cells as corrosion of said electronegative metal proceeds and other electropositive particles become exposed as initially exposed pellets become dislodged from said mass of electronegative metal due to dissolution of the latter.

KENNETH LEA McINTOSH.

REFERENCES CITED

The following references are of record in the file of this patent:

UNITED STATES PATENTS

| Number | Name | Date |
| --- | --- | --- |
| 525,303 | Woods | Aug. 28, 1894 |
| 1,058,113 | Butler | Apr. 8, 1913 |
| 2,451,067 | Stuckel | Oct. 12, 1948 |